United States Patent [19]

Lockhart

[11] 4,369,846

[45] Jan. 25, 1983

[54] TILLING MACHINE FOR SANDY SOIL

[76] Inventor: Harry D. Lockhart, 2965 S. Acoma St., Englewood, Colo. 80110

[21] Appl. No.: 285,065

[22] Filed: Jul. 20, 1981

[51] Int. Cl.³ .......................................... A01B 33/02
[52] U.S. Cl. ...................... 172/60; 172/56; 172/78; 172/116; 172/678; 172/679
[58] Field of Search ............... 172/60, 48, 49, 56, 172/52, 76–79, 116, 421, 480, 433, 15, 678, 679, 680, 119–123

[56] References Cited

U.S. PATENT DOCUMENTS

| | | | |
|---|---|---|---|
| 91,445 | 6/1869 | Hunt | 172/421 |
| 284,036 | 8/1883 | McBride | 172/421 X |
| 1,333,543 | 3/1920 | Greene | 172/116 X |
| 1,421,968 | 7/1922 | Lewis | 172/49 |
| 1,665,532 | 4/1928 | Cook | 172/78 |
| 3,773,112 | 11/1973 | Zinck | 172/49 X |
| 3,977,475 | 8/1976 | Zugai | 172/15 |
| 4,066,131 | 1/1978 | Zandbergen | 172/78 X |

FOREIGN PATENT DOCUMENTS

| | | | |
|---|---|---|---|
| 402031 | 9/1924 | Fed. Rep. of Germany | 172/123 |
| 132236 | 9/1929 | Switzerland | 172/49 |

*Primary Examiner*—Paul E. Shapiro
*Attorney, Agent, or Firm*—Kyle W. Rost

[57] ABSTRACT

A frame carries two transverse digger shafts each having a plurality of diggers mounted thereon in spaced apart relationship such that the diggers form independent furrows. The frame is supported on wheels on a single axis between the two digger shafts and it tiltable on this axis substantially independently of the three point hitch by virtue of a pair of pivoted connections between the hitch and the frame. A longitudinal tilt arm extends from an elevated position over the frame and is connected near its forward end by a resilient member to the hitch or to a selected attachment point on a rigid telescoping member also extending between the tilt arm and hitch. The tilt of the frame is also biased by placement of the wheel frame axis slightly to the rear of the frame's center of gravity. The digger shafts are connected to the drive for opposite relative rotation with the rear shaft rotating rearwardly whereby its diggers apply a retarding force to the frame and stabilize the frame on the frame wheel axis. The individual diggers are broad faced for throwing sandy soil at least partially onto the ridge structure formed between furrows, and the diggers are spaced apart preferably in the range of from three to five times the width of a digger face.

11 Claims, 6 Drawing Figures

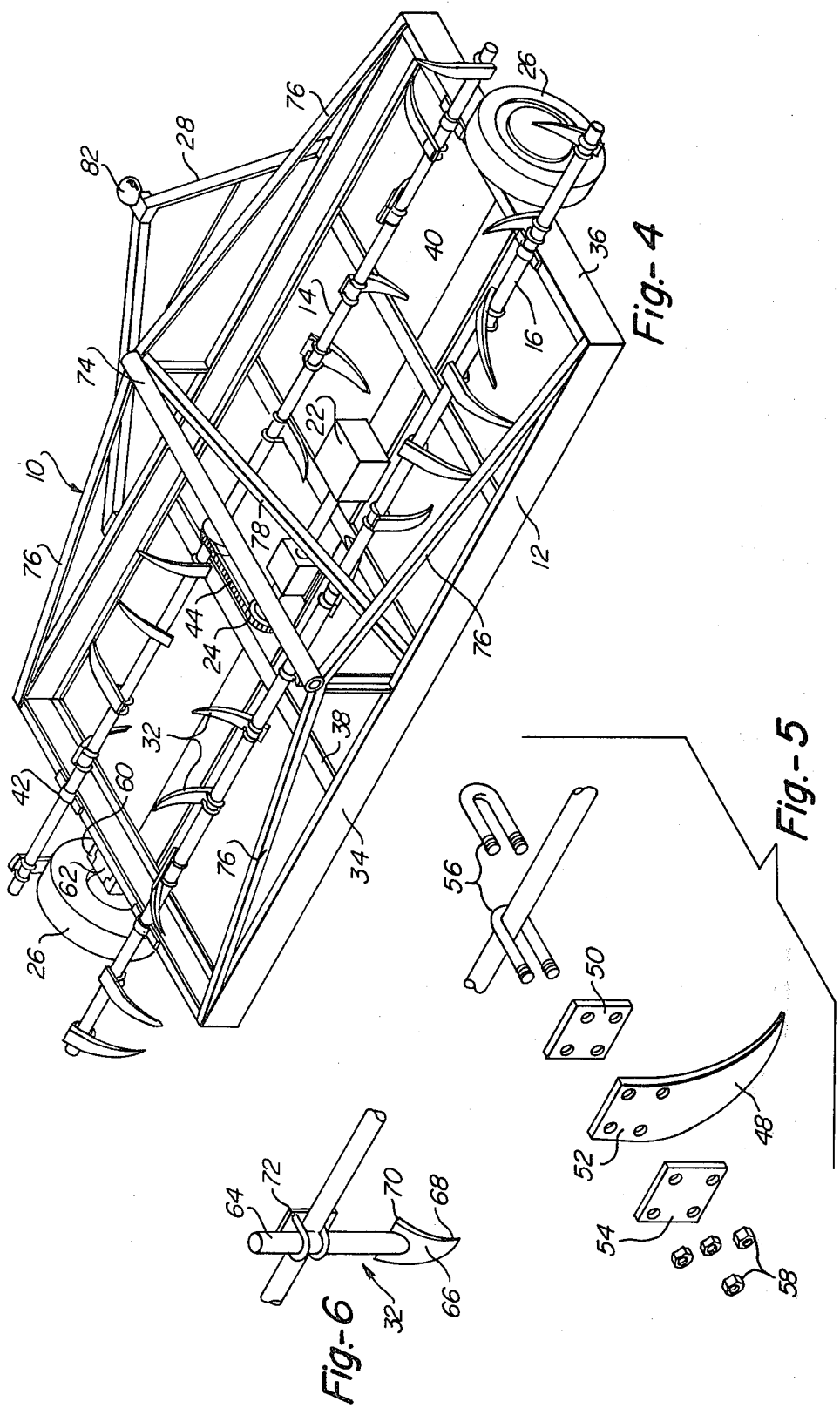

TILLING MACHINE FOR SANDY SOIL

BACKGROUND OF THE INVENTION

1. Field of the Invention

The invention relates to earth working and specifically to agricultural tilling apparatus having counter-rotating digger shafts carried on a centrally tiltable frame with the diggers being adapted to till sandy soils while leaving an untilled ridge between furrows.

2. Description of the Prior Art

Cultivators are generally adapted to do a substantially complete job of breaking-up soil clumps throughout the width of the cultivator apparatus, whereby the soil is fully prepared to receive seeds at any desired location in the pulverized path created by passage of the apparatus. An example is provided by the small garden cultivator described in U.S. Pat. No. 3,773,112 to Zinck, which apparatus employs a pair of parallel shafts each carrying a plurality of digger blades or hoeing tools, said shafts being powered to rotate in respectively opposite directions. A commercial embodiment of this patented device has been observed to break-up the soil to an extreme degree.

On a larger scale, farm equipment has been proposed in Swiss Pat. No. 132,236 to Grunder & Co. for a tractor driven apparatus employing counter-rotating digger shafts having the diggers on the rear shaft spaced between the diggers on the front shaft, with the digger spacings suggesting that the soil is again thoroughly broken-up. Another apparatus having counter-rotating shafts is taught in U.S. Pat. No. 1,333,543 to Greene, wherein the shafts are carried on a self-propelled cart.

Although the noted devices are capable of adequately tilling soil, in some applications it is desirable to leave a portion of the soil untilled, such as the soil between the seed rows. Especially in areas having sandy soil or adobe-like soil, wind erosion creates a major problem if the soil is over-cultivated. Often these types of soil achieve stability when not disturbed by a tiller, and thus, wind does not erode the ground in untilled areas as badly as in tilled areas. The conventional philosophy of tilling the entire width of soil in the path of the tiller therefore is a detriment when sandy or adobe-like soils are encountered in windy areas.

A further unanswered need in the cultivation of such soils especially prone to wind erosion is the ability to quickly adjust the depth of tiller blades as the tilling machine is traversing the fields. Because cultivation should be minimized to prevent loose soils, tiller blades may advantageously be carried in such a manner that their digging depth is substantially instantaneously adjusted as the tiller crosses high or low points in a field. If the tiller blades are carried on a cart with front and rear wheels, the blades can easily dig too deeply into the soil at a sudden rise in the field, while depth cannot be efficiently controlled if the digger shafts have no supporting wheels at all.

A further problem with sandy soil is that it tends to have very little cohesiveness immediately after being tilled. The conventionally proposed digger blade resembles a curved, pointed rod or a curved knife, adapted to enter and break cohesive soils. In sandy soil, the path created by such a relatively narrow, sharp blade is itself very narrow both because of the narrow blade width and because the sandy soil may fall back into the furrow. In sandy areas, the conventional tiller blade may therefore be inadequate to create a furrow having a wind resistant design. A broader blade creates another possible problem by raising a great deal of dust that may contaminate the tiller motor.

The present invention seeks to create a tiller for sandy soils that solves all of the above problems.

SUMMARY OF THE INVENTION

A tilling machine for sandy soil cultivation is defined by a supporting frame carrying a pair of rotatable transverse digger shafts spaced apart on opposite longitudinal halves of the frame and joined to a driving mechanism for rotation in respectively opposite directions, the front shaft rotating such that its carried digger blades tend to propel the frame in a forward direction, and the rear shaft rotating in such a direction that its carried digger blades tend to urge the frame in the rearward direction. The blades themselves have broad ground-contact faces for throwing the sandy soil aside to define a furrow. The blades are staggered on the opposite shafts so that each blade defines its own furrow, and the blades are laterally spaced to create a center ridge of undisturbed soil capped by the displaced soil from the furrows between each pair of adjacent furrows. The frame is supported on a pair of wheels approximately on the transverse axis through the center of gravity of the frame, permitting the frame to be tilted or biased to a desired degree of tilt by a resilient means. The wheels are carried by a height adjustable supporting mechanism so that the frame and digger bith may be preselected. Alternatively, the diggers themselves may be carried on the digger shafts in a length-adjustable manner.

The frame is attached to the tractor or other source of motive power by a conventional three point hitch. The hitch is supported pivotally to both the frame and the tractor so that the frame can tilt independently of the tractor. The front-to-rear attitude of the frame is controlled by a longitudinal arm joined to the frame by suitable supports such as by rafter braces that also maintain the frame against sagging. The longitudinal arm is carried above the digger shafts and side members of the frame so that a resilient tie-down means may be attached between the forward end of the longitudinal arm and the forward end of the hitch. The resilient tie-down means may include a telescoping arm providing rigidity of the connection, plus a spring that applies the desired degree of compression between the frame and hitch.

The main object of the invention is to create a tiller that is capable of tilling furrows in sandy areas while preserving the integrity of the soil structure between furrows. By employing broad-faced digger blades spaced relatively far apart, the invention permits the soil between furrows to remain undisturbed and to be capped by the sand thrown from the furrows on either side. A ridge and furrow structure is thereby created that captures drift sand and water.

This and other objects are achieved as more fully described in the following detailed embodiment.

BRIEF DESCRIPTION OF THE DRAWINGS

FIG. 4 is an isometric view thereof.

FIG. 5 is an exploded view of a digger adapted for sandy soil, showing its mounting on the digger shaft.

FIG. 6 is an isometric view of another embodiment of the digger.

DESCRIPTION OF THE PREFERRED EMBODIMENT

Figure 1:
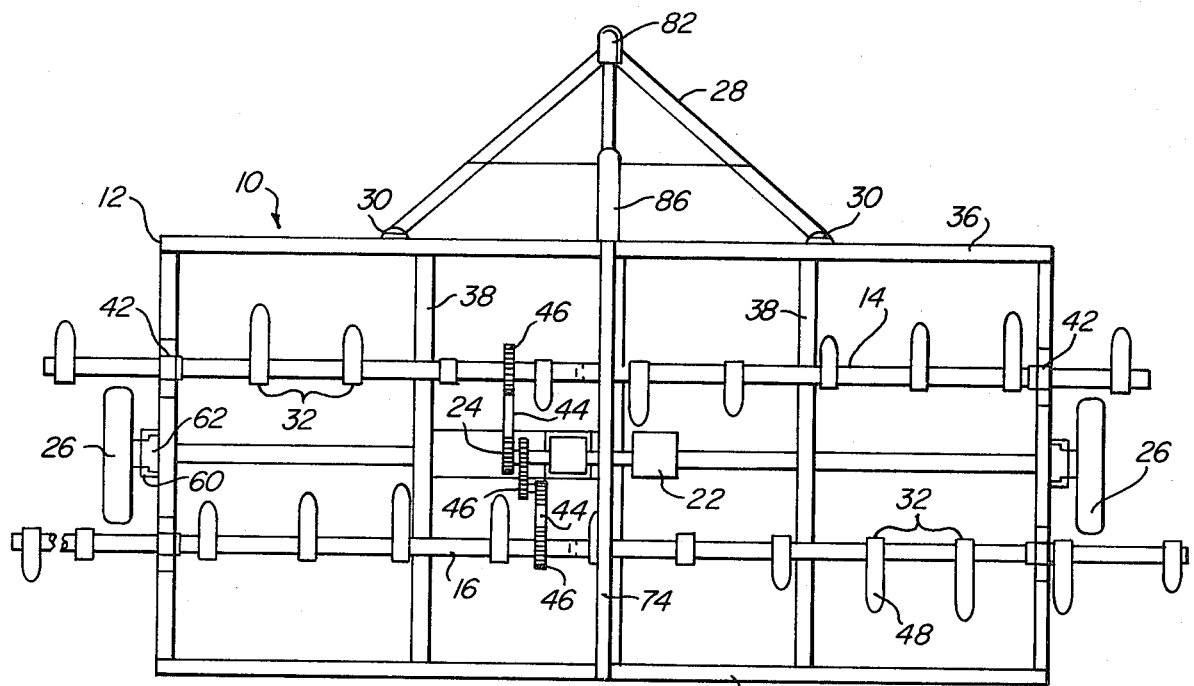
FIG. 1 is a top plan view of the tiller.
Figure 2:
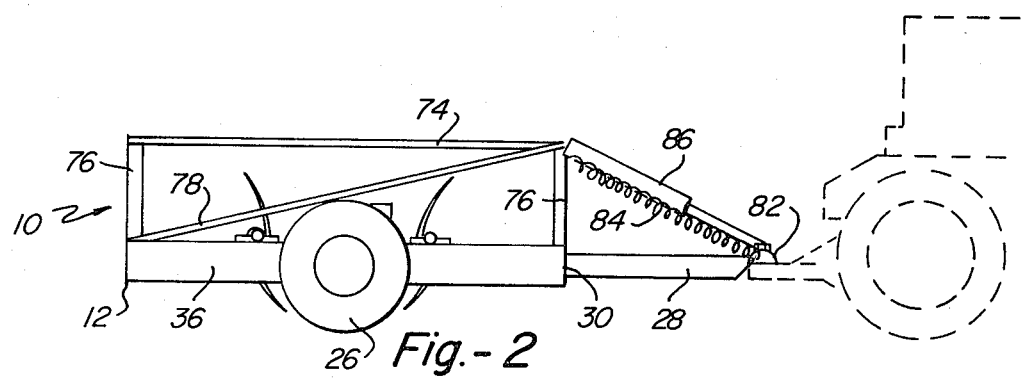
FIG. 2 is a side elevational view thereof, showing a tractor in phantom.
Figure 3:
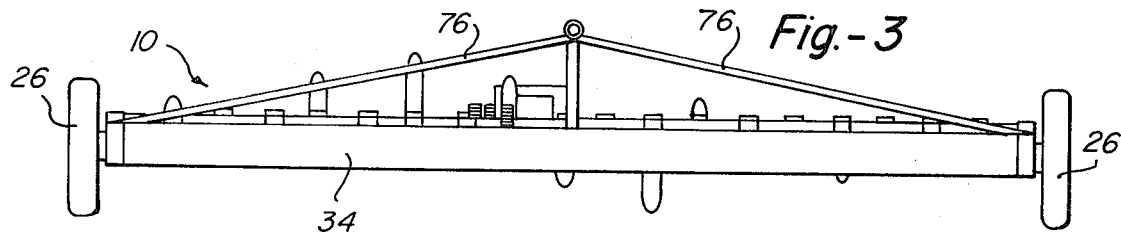
FIG. 3 is a rear elevational view thereof.

With reference to the drawing of FIG. 1, the tiller 10 is shown to be constructed from a support frame 12 carrying a pair of digger shafts transversely mounted, with front shaft 14 and rear shaft 16 being substantially parallel and carried on opposite longitudinal halves of the frame 12. The shafts are powered for rotation in opposite directions, such as by a power take off from a tractor, supplying power to speed reducer 22 and shaft drive means 24, in turn driving the shafts 14 and 16. The frame is supported at its opposite sides by a pair of wheels 26 located approximately on the transverse axis passing through the center of gravity of the frame, such that the frame can be tilted with a minimum of effort. A three point hitch 28 is adapted to tow the tiller while allowing the frame to tilt through pivoted connections 30 between the hitch and frame.

The tiller 10 is intended for use in areas having sandy soil where a furrow is desired but the area between furrows may advantageously remain untilled. Accordingly, the frame may be relatively wide in order to accommodate a suitable number of diggers 32 on the digger shafts in widely spaced locations, permitting a ridge to remain between furrows. The preferred frame is formed from front and rear members 34 each about twenty feet in length and formed from square tubing or channel. Side members 36 may be formed from the same type of members and have a length of eight and one-third feet. Together members 34 and 36 define a rectangle. Longitudinal cross-members 38 and lateral cross-members 40 provide support within the rectangular frame for the digger shafts, speed reducer, and shaft drive means.

The digger shafts 14 and 16 are supported for rotation, for example by pillow blocks or bearings 42 carried by frame members 36 and 38. Front shaft 14 is carried fowardly of the frame's center of gravity while rear shaft 16 is behind the center of gravity. Speed reducer 22 and wheels 26 are approximately in line with the transverse axis passing through the center of gravity, although the wheels may be to the rear of this axis by several inches. Due to the symmetry of the rectangular frame and digger shafts, the center of gravity is also approximately the center of geometry. The shafts 14 and 16 are therefore equidistant from the central transverse axis. Shaft drive means 24 connecting the speed reducer to the shafts may be enclosed in a housing (not shown) providing an oil bath for lubrication of the moving parts and preventing dirt contamination. The shaft drive means may include roller chains 44 and sprockets 46 arranged to rotate the shafts 14 and 16 in opposite directions, preferably with the front shaft rotating in the forward direction and the rear shaft rotation in the rearward direction.

The diggers are best shown in FIGS. 1 and 5 to be curved blades 48 having relatively broad faces for contacting the soil. In the embodiment wherein the tiller is twenty feet wide, twelve digger blades 48 may be carried on each shaft with twenty-four inches separating adjacent blades, center line to center line. Because the blades are equally staggered between the front and rear shafts, the twenty-four inch spacing of the diggers on each shaft results in a twelve inch spacing between furrows produced by the passage of both shafts. The width of each blade 48 may be from two to four inches, leaving an undisturbed ridge area eight inches wide between adjacent four inch wide furrows.

The diggers may be mounted to the digger shafts at predetermined positions. In FIG. 5, one suitable mounting structure is shown to include mounting plates 50 welded to the shafts at the position and relative angles desired. Each digger bprecise angular and positional alignment. A pressure plate 54 may cover the opposite side of the shank, and U-clamps 56 may then partially encircle the shaft and pass through aligned mounting holes in the mounting plate, shank, and pressure plate after which the clamps are securely fastened by nuts 58. Bent or broken blades are replaced quickly and accurately.

The height of the frame 12 from the ground is controlled within a predetermined range by adjustment of the wheels 26 in height adjustable mountings 60 having a vertical slot and attached to the sides of the frame. Each wheel is connected to a bearing block adapted to slide in the mountings. Tilling depth for diggers 48 is therefore preselected by locating the bearing blocks 62 at the desired position in mountings 60.

The engagement between the digger blades and the soil may be adjusted not only by changing the frame height, but also by changing the blade position on the digger shafts. In FIG. 6, a digger 32 is shown to include a shank portion 64 formed, for example, from steel rod. At one end of the shank portion, a head portion 66 is attached. The head portion includes a narrow tip 68 for breaking the surface of the soil and a broad upper end 70 for throwing aside the sandy soil. This digger thus has a broad soil contacting face similar to that on the embodiment of FIG. 5. A releasable fastening means such as clamp 72 may attach the shank to the digger shaft at substantially any point along the shank. In order to prevent the undesired slipage of clamp 72 around the digger shaft, a cotter pin or other locking device may engage both the shank 64 and the digger shaft. It is preferred that such a pin be capable of shearing before the digger or digger shaft is damaged in the event the digger should strike an obstruction such as a rock. The locking device may be employed with the digger of FIG. 6 in an alternate arrangement wherein the clamp 72 and the digger shaft are interconnected, such as by a pin through the side of the clamp opposite from the shank 64. The latter arrangement permits the shank to be clamped without regard to the position of holes through the shank itself.

The digger shafts 14 and 16 support the diggers in positions to permit the wheels 26 to ride on the unbroken ground between furrows. In FIGS. 1 and 4, shafts 14 and 16 extend laterally beyond the wheels. Diggers on the front shaft 14 are offset from the wheel path, while diggers on the rear shaft may dig a furrow behind the wheels. This spacing of diggers permits the furrows to be substantially uniformly spaced across a field while avoiding unevenness in depth due to having a wheel ride in a furrow.

The hitch 28 accommodates tilting of the frame 12 by means of a tilting connection to the frame at pivot point 30 between the frame and hitch. The tilt of the frame is further controlled by a longitudinal tilt arm 74 supported above the level of the diggers by a suitable superstructure, such as by rafter braces 76 located near forward and rearward ends of the frame 12. In addition, a diagonal brace 78 may extend from its lower end at the rear of frame 12 to an upper end at the union of the forward rafter brace and the tilt arm. A tie-down means 80 is length adjustable and attaches the tilt arm to an object exterior of the frame in order to establish the desired tilt. The tie-down means is preferred to attach between the forward end of the tilt arm and the forward end of the hitch, such as at hitch fastener 82. The tie-down means may include a resilient means such as spring 84, and further may include a telescoping rod 86. The positioning of the tie-down means from an elevated position at the front of the frame to the hitch fastener 82 allows the frame to be tilted forward so that the front diggers will have a greater bite in the soil.

In operation, the tiller is adjusted for a preselected digger bite by setting the wheel blocks 62 at the desired position in the mountings 60 and by adjusting the individual diggers to the necessary length relative to the digger shafts. The tilt is adjusted at the tie-down means, such as by adjusting the connection of the lower end of the spring 84 to the desired point between the hitch fastener and the upper end of the rigid telescoping rod 86. The desired forward tilt of the frame is aided by having the wheels 26 a few inches to the rear of the central lateral axis across the frame. A four inch set back of the wheels 26 has been found to be appropriate for a tiller of the proposed dimensions.

As the tiller is moved across a field, the front diggers provide a driving force to aid the tractor, while the rear diggers provide a stabilizing force that aids in deeping all diggers engaged in the soil. Each digger forms an independent furrow in the sandy soil while removing some of the soil to the inter-furrow ridge. The diggers on each shaft are preferred to be spaced apart by at least three times the width of a digger face, with a spacing of five times the width of a digger face being approximately the proposed spacing in the above suggested dimensions, provided that the digger faces are each four inches wide. The resulting intermediate ridge, twenty inches wide, provides an adequate roadway for the tiller tires, and the final ridge width after passage of the rear digger shaft will provide approximately eight inch wide ridges. The furrow and ridge structure in sandy areas tends to capture drift sand and water and thereby limits the effects of erosion.

I claim:

1. A tilling machine adapted for use with sandy soil, comprising:
   (a) a frame carrying at least two parallel transverse rotatable digger shafts, each shaft carrying a plurality of broad-faced sand diggers, said diggers being laterally spaced apart by a distance greater than the face of a digger such that an untilled ridge remains between furrows created by the passage of all diggers on said shafts;
   (b) a pair of wheels connected to said frame on a single transverse axis parallel to and intermediate said two digger shafts, each wheel having associated therewith a mounting means for variably adjusting the vertical height of the wheel with respect to the frame;
   (c) hitch means for connecting the frame to a source of locomotion;
   (d) tilting connection means between said hitch means and frame for allowing the frame to be tilted on the axis of said pair of wheels;
   (e) a longitudinal tilt arm connected to said frame for application of tilting forces;
   (f) length adjustable tie-down means connected to said tilt arm and fastenable to, in use, an object outside said frame for biasing the tilt arm to a preferred position of tilt; and
   (g) digger shaft rotating means.

2. The tilling machine of clam 1, wherein the diggers on said digger shafts are non-aligned longitudinally with any digger on the opposite shaft, and diggers on the same shaft are spaced apart by at least three times the width of a digger face for permitting a ridge at least as wide as a digger face to be untilled after passage of both shafts of said machine.

3. The tilling machine of claim 2, wherein said broad-faced sand diggers have a width substantially between two and four inches at the ground engaging portion thereof.

4. The tilling machine of claim 2, wherein the diggers on the rear shaft are positioned substantially longitudinally centrally between pairs of diggers on the front shaft.

5. The tilling machine of claim 2, wherein the diggers on the same shaft are spaced apart by at least five times the width of a digger face.

6. The tilling machine of claim 1, wherein each of said sand diggers comprises a shank portion and a head portion, and further comprising a releasable fastening means for attaching the shank portion to the digger shaft at variable positions for adjusting the engagement of the head portion with the ground.

7. The tilling machine of claim 6, wherein said shank portion comprises an elongated shaft and said head portion comprises an outer tip and an inner base, wherein said base is connected to the elongated shaft and is broader than the elongated shaft in transverse dimension.

8. The tilling machine of claim 1, wherein said tie-down means comprises a resilient member connected between the forward end of said frame and the forward end of said hitch means.

9. The tilling machine of claim 8, wherein said tie-down means further comprises a telescoping rigid member connected between the forward end of said frame and the forward end of said hitch means.

10. The tilling machine of claim 1, further comprising at least one rafter brace connected between opposite lateral sides of said frame for preventing central sagging thereof and carrying said tilt arm thereon at a position above the hitch means, whereby said tie-down means biases the forward end of said frame downwardly.

11. The tilling member of claim 1, wherein said digger shaft rotating means is adapted to rotate said two digger shafts in opposite directions, wherein the front shaft is rotated to impart a driving force to the tiller and the rear shaft is rotated to impart a retarding force for stabilizing the frame against tilting on the axis of said wheels; and wherein said transverse wheel axis is behind the center of gravity of said frame for biasing the frame toward a forward tilt.

* * * * *